(12) United States Patent
Myer (10) Patent No.: US 9,652,985 B2
(45) Date of Patent: May 16, 2017

(54) VEHICLE GUIDANCE SYSTEM

(71) Applicant: Seth Jamison Myer, Provo, UT (US)

(72) Inventor: Seth Jamison Myer, Provo, UT (US)

( * ) Notice: Subject to any disclaimer, the term of this patent is extended or adjusted under 35 U.S.C. 154(b) by 0 days.

(21) Appl. No.: 14/951,356

(22) Filed: Nov. 24, 2015

(65) Prior Publication Data

US 2016/0189542 A1    Jun. 30, 2016

Related U.S. Application Data

(60) Provisional application No. 62/123,671, filed on Nov. 24, 2014.

(51) Int. Cl.
| | | |
|---|---|---|
| *G08G 1/09* | (2006.01) | |
| *G08G 1/0967* | (2006.01) | |
| *H02S 30/10* | (2014.01) | |
| *H02S 40/32* | (2014.01) | |
| *H02S 40/38* | (2014.01) | |
| *H02J 3/38* | (2006.01) | |
| *H02J 7/35* | (2006.01) | |

(52) U.S. Cl.
CPC ........ *G08G 1/096783* (2013.01); *H02J 3/385* (2013.01); *H02J 7/35* (2013.01); *H02S 30/10* (2014.12); *H02S 40/32* (2014.12); *H02S 40/38* (2014.12)

(58) Field of Classification Search
CPC ................................................ G08G 1/096783
USPC ....................................................... 340/905
See application file for complete search history.

(56) References Cited

U.S. PATENT DOCUMENTS

| | | | | |
|---|---|---|---|---|
| 9,293,042 | B1* | 3/2016 | Wasserman | G07C 5/006 |
| 2002/0145519 | A1* | 10/2002 | Hykawy | G08G 1/164 |
| | | | | 340/567 |
| 2006/0020389 | A1* | 1/2006 | Yamamoto | G01C 21/26 |
| | | | | 701/494 |
| 2008/0162036 | A1* | 7/2008 | Breed | G08G 1/161 |
| | | | | 701/408 |
| 2009/0040750 | A1* | 2/2009 | Myer | F21S 8/083 |
| | | | | 362/183 |
| 2009/0105942 | A1* | 4/2009 | Lin | G01C 21/3691 |
| | | | | 701/533 |
| 2009/0233575 | A1* | 9/2009 | Morrison | G08G 1/096725 |
| | | | | 455/404.2 |
| 2010/0029268 | A1* | 2/2010 | Myer | F21S 2/00 |
| | | | | 455/426.1 |
| 2012/0143383 | A1* | 6/2012 | Cooperrider | H04Q 9/00 |
| | | | | 700/295 |

(Continued)

*Primary Examiner* — Santiago Garcia (57) ABSTRACT

A vehicle guidance system (VGS) facilitates interaction between human operated vehicles (HOV), autonomous driverless vehicles (ADV), and/or semi-autonomous vehicles, on the roadway, allowing safe interface with each other and with other elements, for example, weather conditions, traffic control systems, road conditions, obstructions that enter the roadway (people, rocks, animals, debris falling onto roadway from other vehicles), etc. The system provides guidance, communication, and control for the vehicles on the roadway, by using a solar-powered system comprising post assemblies having solar panel(s), sensors, forward and/or downward lighting, and other indicators/alarms to signal to the vehicle or driver regarding road, bridge, weather, accident, speeding, or other conditions of concern in the vicinity for safety and/or operability of the vehicle/driver(s).

15 Claims, 7 Drawing Sheets

(56) References Cited

U.S. PATENT DOCUMENTS

| | | | |
|---|---|---|---|
| 2012/0323474 A1* | 12/2012 | Breed | B60W 30/04 |
| | | | 701/117 |
| 2013/0113618 A1* | 5/2013 | Flanagan | E01F 9/559 |
| | | | 340/539.1 |
| 2014/0253345 A1* | 9/2014 | Breed | G08G 1/096716 |
| | | | 340/905 |
| 2015/0145698 A1* | 5/2015 | Werner | H05B 37/0218 |
| | | | 340/928 |
| 2016/0133130 A1* | 5/2016 | Grimm | G08G 1/096766 |
| | | | 340/905 |
| 2016/0267790 A1* | 9/2016 | Raamot | G08G 1/0145 |

* cited by examiner

VEHICLE GUIDANCE SYSTEM

This application claims benefit of Provisional Application Ser. No. 62/123,671, filed Nov. 24, 2014, which is incorporated herein by this reference.

BACKGROUND OF THE INVENTION

Field of the Invention

The invention relates to a system to facilitate the interaction between human operated vehicles (HOV) and autonomous driverless vehicles (ADV) on the roadway, allowing safe interface with each other and with other elements, such as road hazards, weather conditions, or other road conditions.

SUMMARY

The objectives of the invented vehicle guidance system (VGS) include providing a system to facilitate the interaction between human operated vehicles (HOV) and autonomous driverless vehicles (ADV), on the roadway, allowing safe interface with each other and with other elements, for example, weather conditions, traffic control systems, road conditions, obstructions that enter the roadway (people, rocks, animals, debris falling onto roadway from other vehicles), etc. In addition to HOVs and ADVs, there will also be semi-autonomous vehicles on the roadway prior to the full implementation of ADVs. Throughout this document, the acronym "ADV" is used to reference the general category of both autonomous and semi-autonomous vehicles.

The invented system provides guidance, communication and control for the vehicles on the roadway. The way the guidance is communicated to the vehicles needs to be compatible with all vehicle types (HOV and ADV) and allow the safe interaction of all vehicle types on the roadway system. Current developments regarding ADVs center on making them (ADVs) compatible with existing systems. Most existing roadway systems are designed around traditional HOVs—and normally do not address how HOVs interact with ADVs.

DETAILED DESCRIPTION OF CERTAIN EMBODIMENTS

Preferred embodiments of the invention provide a system to facilitate the interaction between human operated vehicles (HOV) and autonomous driverless vehicles (ADV) on the roadway, allowing safe interface with each other and with other elements, for example, weather conditions, traffic control systems, road conditions, obstructions that enter the roadway (people, rocks, animals, debris falling onto roadway from other vehicles), etc. In addition to HOVs and ADVs, there will also be semi-autonomous vehicles on the roadway prior to the full implementation of ADVs. Throughout this document, the acronym "ADV" is used to reference the general category of both autonomous and semi-autonomous vehicles.

The system provides guidance, communication and control for the vehicles on the roadway. The way the guidance is communicated to the vehicles needs to be compatible with all vehicle types (HOV and ADV) and allow the safe interaction of all vehicle types on the roadway system. Current developments regarding ADVs center on making them (ADVs) compatible with existing systems. Most existing roadway systems are designed around traditional HOVs—and normally do not address how HOVs interact with ADVs.

One Example of Operation:

One example of how this would work in practice follows. A large utility pole is hit and knocked down onto the roadway. There are two sets of vehicles that could be affected by this event (obstruction on the roadway):

1. Immediate vicinity: HOVs in the immediate area who actually see the obstruction in time will drive around it (if possible). On-board sensors in the ADVs will also drive around the obstruction (if it is "seen" or otherwise detected by the sensors). In inclement weather, the obstruction may not be easily seen (or seen in time if the vehicle is travelling at a high rate of speed).
2. Second arrivers: Vehicles behind the incident location that will be arriving in the near future will encounter the same obstruction, but cannot see it until they are closer. The VGS alerts all drivers (HOVs and ADVs) to the obstruction in two ways:
    1. Roadway based:
        A. Visual alerts on roadway—guidance posts 1 along the roadway will flash a specific color indicating that there is an obstruction ahead. The warning signal 13 will flash on the side of the road where the obstruction is—alerting driver to use caution and to move to the other lane.
        B. Auditory alerts—warning signal sounds and/or instructions provided over speakers.
    2. Vehicle based—Alerts are provided to the driver (or driving system in ADV) regarding the obstruction. Details about the location of the obstruction along with real-time data about how the traffic is flowing ahead, and what action can be taken by the driver to avoid the obstruction ahead.

In order to provide this information to the vehicles, the roadway needs to have a network of sensors that enable this info to be gathered and provided. There also needs to be a notification system (along the roadway) to relay this info to the vehicles.

How the Objectives May be Met in Certain Embodiments:

The VGS comprises roadway sensors and systems that provide the required guidance (communication and control). These sensors and systems should be autonomous—able to operate when connected to the system and/or if there are any failures in the system. It should be self-supported (solar or wind-powered with batteries or energy storage system) for the power required to operate the sensors and signal devices.

Each device is programmed with a minimal or "base" set of functions that allows it to operate even if disconnected from the network. For example—a post that normally provides lighting to the roadway at night will still provide this function every night with or without a network connection.

The system treats each autonomous device or system component as a separate "node" on the network. The network that allows communication between these nodes is of the wireless "mesh" network type (such as ZigBee network) in that it allows additional nodes to be incorporated into the system in the future, or the deletion of nodes without affecting the overall continuity and/or operation of the network with these changes.

The system uses one or more of several different COMMUNICATION means to relay information: Wireless (radio transmission of various wavelengths and frequencies), Visible Light Communication (VLC), sound communication systems. Examples of how it can be implemented include, but are not limited to: WIFI, cellular, bluetooth, satellite Radio, Free-space optical, Sonic, Electromagnetic induction, Remote controls, IrDA, RFID (Radio Frequency Identification), TransferJet, Wireless USB, DSRC (Dedicated Short Range Communications), EnOcean, Near Field Communication, etc.

The required devices and system components (radios, antennas, receivers, etc.) are located in the base of the post, or in the post itself. All of the networking components are in the base so that in the event of a vehicle hitting the post (the post breaking away at the connection to the base), the base can still communicate the event (post gone) to the network for repair notification.

The network utilizes both short range and long range communication technologies based on the nature of the data being transmitted. For example, short range communications could utilize ZigBee sensors/radios then relayed to a master station via a cell phone or satellite radio (long range). Many of the roadway functions are local and could be handled with the short range devices and systems.

An example of both short and long range functions: A series of ice and temperature sensors mounted near a remote roadway utilizes the short range system to communicate data from multiple "basic" nodes to a single "advanced" node location with the long range equipment. The long range node communicates this data (via satellite radio) to a home base where the snowplows can be dispatched to that specific roadway section to clear the snow.

The system incorporates any and all required SENSOR types including but not limited to motion, velocity, infrared, optical, moisture, temperature, wind speed (anemometer). For example, a series of roadway posts could be equipped with motion sensors to determine vehicle speed and direction. This data could be utilized locally to light the roadway ahead of the vehicles. The data could also be transmitted via the long range system to a home or master station. Any number of sensor types or input devices (call buttons, security cameras, etc.) and/or notification devices (lights, speakers, etc.) can be placed on the post(s).

The VGS can also interface with existing networks or conventional networks, such as those currently available commercially, including "smart" street light systems such as INOVUS SOLAR™, and/or CISCO/PHILLIPS™ systems. The data from these other networks could be imported into the VGS. If these systems allow input data for control, the VGS can export additional salient data to these systems to enhance their operation.

Local AHJ's (authority having jurisdiction) may also need information about conditions on the roadway and about the traffic flow, including accidents or issues that need to be addressed. The data gathered by the VGS can also communicate this data to the AHJ.

The network are preferably along the roadway for 2 reasons:
1. Sensor to network communication: The sensors need to be located along the roadway or surrounding areas in order to capture specific events that happen on or near the roadway (and/or vehicles travelling on the roadway). The short and long range communication devices are required to collect and relay the data from these events.
2. Visual and auditory notifications to drivers must be near the roadway.

The posts are preferably close together (for example, less than 75 feet apart, less than 50 feet, less than 30, or less than 20 feet apart), because:
1. Short-range wireless communications are improved the closer the posts are to each other. Also, if a post is removed or damaged, the adjacent posts are still close enough to maintain network communication.
2. More uniform lighting is provided.
3. Safety is enhanced, by more visibility to drivers, and the identifying of curves ahead and/or road hazards.

The posts are preferably short because:
1. Safety is enhanced: More visible (at eye level) reduce glare compared to traditional street lighting. Posts can be placed closer together providing more uniform lighting. If hit by a vehicle there is less damage to the vehicle—posts more easily "break-away" from the base.
2. Maintenance is enhanced: Easily accessible for repair and/or replacement.
3. Cost is reduced: Lower cost of traditional poles allows more to be installed.

The solar panel is preferably at the base of the Pole because:
1. Post is not required to support the weight and/or the wind loading of the solar collector(s). This reduces the cost of the post and allows the use of lower strength materials, which provides the added benefit of allowing the "breakaway" of the post from the base and lessening the physical damage to vehicles that hit or run over the downed post.
2. Solar panel is angled at base to allow debris (dirt, snow, etc.) to fall off or be washed off by rain and wind.
3. The specific size of the base can be configured to match specific application, for example, it could be installed on a concrete barrier (FIG. 2a) or could be larger to collect more solar energy.

Main Components:

The VGS comprises, or in certain embodiments consists essentially of or consists of, a series of posts, sensors and sensor networks, roadway markers and communication systems that run along the roadway (similar to normal roadside marker posts) that provide the network of sensors and indicators. These effectively replace the reflector posts, since they would not only illuminate the roadway, but also provide an enhanced version of the basic function that the reflector posts previously accomplished.

The post assembly is called the "Vehicle Guidance System Post" (VGSP). The VGSPs are short (similar height to current roadside marker posts). The VGSP has LED lights that illuminate the roadway and activate adjacent posts. The light is powered by energy produced by integrated solar cells that charge batteries. This allows each VGSP to be autonomous (no electrical support infrastructure or wiring required).

The "activation" of adjacent VGSPs allows communication between VGSPs to relay info about direction & speed of travel of all vehicles on the roadway and other salient info (for example—the system could be tied to other roadway systems to improve safety for the drivers & alert them of conditions ahead—slowdowns or other special road conditions).

As the car travels along the roadway, the VGSPs are illuminated a quarter of a mile (or user preset distance) ahead of the travel—lighting the way ahead of the car (showing curves ahead in the roadway which headlights cannot reach), then the lighting is turned off after all of the cars have passed by (conserving energy). Small notification 13 LEDs can be optionally "left on" when there are no cars on the road (again—by user preset).

The "basic" system utilizes the solar cells 4 on each post as light sensors to receive the light from adjacent VGSPs. As vehicles pass between the VGSPs, the light pathway is interrupted & the motion of the vehicle is identified by this disturbance. As the vehicle passes between multiple VGSPs, the system determines the speed and direction of the vehicle. Typically, as vehicles first "enter" the VGS network, the vehicle's headlights will activate the system. Other options for activating the system include motion sensors 97, vibration sensors 74, and anemometers 70 (detects the wind created by passing vehicles).

In addition to the posts, the VGS utilizes solar powered road "stud"s (SPRS) 15 in cases where there are multiple lanes of traffic and/or a rural two-lane highway with traffic flowing both directions. This enables the system to have additional sensors to improve the operation of the system. For example, for a 2-lane highway with a single lane going each direction, the VGS system employs the SPRS to sense and control the lighting for either and/or both directions of travel. Otherwise the passing of vehicles between the sensors on both sides of the road is not always able to determine which direction of motion it is sensing (multiple cars in opposite directions passing between the same posts simultaneously)

VGS components are typically mounted to upright posts—similar to the roadside reflector posts seen proliferated on highways and roadways throughout the world. In addition to mounting to posts—the components are mounted to the top of guard rails, concrete roadway barriers 40, integrated with signposts 43, mounted in a separate enclosure or on top of a pole (as in the case of ice road sensors).

The "standard" post mounted version of the system has the battery(ies) buried in an insulated enclosure 16 below the ground. This protects the battery(ies) from temperature extremes (hot and cold) and prolongs the life of the battery (ies). The battery and post are inserted into an enclosure that has been embedded into the ground. Above ground battery enclosures (if required for barrier-top mounted systems) have additional insulation 18 and/or phase-change material "blankets" or packets to minimize the temperature swings from day to night. The insulating system is designed for the specific geographical area where the posts are to be placed. For example, in areas where the temperature extremes are above the tolerance of the specific battery type used, additional insulation is included.

The posts contain relay equipment 26 (for communication and control as described previously in this document) as required for the system type. Radios or other components are located within the base of the system. Some posts may require more equipment than is feasible for this small format (for some types of long-range satellite equipment for example). In these cases, the system components are located within a larger enclosure or building.

Part of the system comprises components and software that allows the VGS to communicate, control or otherwise interface with other systems as required (vehicle mounted or roadside). One of the main purposes of the VGS is to provide a network support structure to facilitate this interface.

The VGS employs the use of "standard" components so that batteries and LEDs can be replaced as required in the future. Also—the entire post assembly can be removed from the in-ground stake and replaced with a new post so that the existing post can be repaired or replaced with minimal down-time.

LED Light Modules:

The LED light Modules (LDM) 6 may be selected from several different types of LED clusters & types. The center LEDS have a broad or wide distribution and are aimed towards the area of the roadway to be illuminated. The "communicator" LED's have a narrow beam spread and are aimed toward adjacent SGL posts and/or SPRS. Communicator LEDs have different colors and wavelengths for specific applications as required. For example—in areas where fog occurs, the LEDs would have the appropriate color & wavelengths to penetrate the fog (also using LEDs as a directional, rather than spherical source). IR LEDs in the 700 nm-950 nm range (outside of visible range) are used in areas as required.

The fog penetrating LDM is typically at the base of the post, since fog is usually thinner lower to the ground. This enables the light to penetrate the fog (tighter beam width) and reach the other side of the road (less "fall-off" as the light travels away from the source).

Notification LEDs:

Each VGSP and SPRS has notification LEDs 13 of different colors to communicate information to the drivers. These are activated only when there is a specific message that needs to be communicated to the HOV. For example, if there is a traffic light ahead (and is unseen around the corner or over a hill), the notification LEDs could turn yellow or start flashing yellow indicating that the light will be changing to red. Any combination of flashing or colors of LEDs can be programmed in to the VGS and visually communicated via these LEDs.

"Marker" LEDs:

Each post has the option of leaving one or several of the notification LEDs illuminated even when there is no traffic. To save power, this is not required on all systems (a normal reflector could be used to save energy).

Energy Management:

At dawn and dusk the control system 22 automatically "turns on" and provides illumination for pre-specified pathways for a set time period (for example for 1 hr. in the morning and 1 hr. in the evening). The Marker LEDs may be all that is required during these times. Additionally—the SPRS lights could be activated during these time periods. These time periods are adjustable and are pre-programmed at the time of initial system installation.

Once the dawn or dusk time period is fulfilled, the balance of the night allows the system to go somewhat "dormant" while awaiting a vehicle to enter the roadway. During the bulk of the night—no power is required for the system. The system "comes alive" when light is detected—either from an adjacent post or from headlights.

This energy management system is embedded in the control system 22 for the purpose of reducing the required energy throughout the night. In cases where there is a lot of traffic and/or higher light levels are required, the posts can be placed closer together. Additionally—the "basic" or "entry-level" SGL has a smaller battery. If the roadway requires more hours of lighting in the future, the system can be upgraded by replacing the smaller battery with a larger one (or additional batteries). The underground enclosure is large enough to accommodate even the largest battery(ies). The space above the smaller battery is filled with insulation.

Additional energy management features include "scaling back" the amount of power to various system devices as required to allow for the minimal system functions to be maintained. For example, basic network functions that allow the entire network to remain operational trump other functions (like lighting the roadway). If daily energy production is lower than usual, the lighting function will be reduced to allow the minimum network functions to be maintained. If there are persistent problems with any given post, the performance (or reduced performance) data is sent to the home base or master station so that a repair truck can be dispatched. This also includes vandalism or a post being hit by a car—if any given post stops operating properly there is an alert sent to the master station.

Sensor/Control Network:

The VGS mesh network (zigbee or similar) allows "self-healing" when additional VGSPs (or other points on the network) are added or deleted.

Each section of network reports to a "master" node which relays the data via a cell radio or satellite radio to the "home" station. In many cases, up to one mile of roadway can be served by one master node. Adjacent networks overlap and can be served by either of their neighboring networks in the case of a lost master node. This provides redundancy to assure the network will remain functioning after any system failure (for example—a vehicle runs over and destroys one of the VGSP master nodes)

The network is able to interface with other sensor networks, for example, including but not limited to:
1. Ice sensors—to indicate snow plows need to be dispatched;
2. Weather stations (wind speed & direction, rain or moisture sensors, etc.);
3. Security systems (cameras, motion sensors, etc.);
4. Fire/smoke sensor systems;
5. Seismic, snow depth, etc., etc.;
6. Deer and animal sensors; and
7. Fog The system adjusts the lighting to accommodate varied conditions. For example, if there are deer or wildlife near the roadway the lights could flash a BLUE color warning drivers to be alert. At dusk or dawn the lighting could be adjusted to enhance visibility during these transitional hours to improve safety.

In areas where there is a lot of wildlife—additional sensor networks could be placed along the landscape next to the roadway to detect animals as they approach the roadway.

Glare:

One of the biggest issues with both traditional pole lights 65 and headlights from oncoming cars is glare. Normal street lights are above the driver's line of sight and throw light in all directions, causing glare when approaching the source.

By placing the light source lower so that the light source is below the plane of vision, glare from the source is minimized. Also, the lights are aimed away from the traffic flow 57—illuminating the roadway ahead.

The brightness of the source is minimized for two reasons:
1. The source is closer to the surface being illuminated, so less light is required.
2. There are multiple (at least 5 times more) light sources contributing to the lighting task.

Having more frequent light sources (rather than being spread out like traditional poles) allows the lighting to be more evenly distributed 58 (eliminating high transitions between light & dark areas). It also allows the refinement of the distribution pattern, so only the light that is needed (without "spill" light). This minimizes the amount of light needed—reducing energy and allowing "dark sky" compliance.

Maintenance:

Traditional light and utility poles are too high to do maintenance without a boom truck or other type of lift system to get to the top of the pole. Any maintenance requires expensive equipment and typically 2 men (so the labor hours are also high).

The VGSPs are easily maintained at ground level and can be removed and taken in to the shop for repair, then replaced as needed (modular) in another location. All of the system components are replaceable, so that it can be repaired rather than replacing the entire post.

As posts are placed within the system—all data pertaining to that location will be uploaded when the post is placed in the new location and the new VGSP will be integrated into the system for that specific location. Upon activation of the post—the system will either accept or reject the VGSP based on it having the correct sensors and functions for that specific location.

Safety:

The main purpose of the VGS is to improve the safety of all vehicles on the road (in all conditions). Statistics show that a disproportionate number of accidents (including fatal accidents) occur at night. The VGS provides a system that improves visibility (without the glare), and adds important warning indicators (roadway signals and wireless communication to cars equipped with receivers).

A key safety feature of the VGS is the fact that the post is low to the ground. Unlike other roadway systems (lighting and utility poles), the posts are short (typically 4 to 5 feet high) so that if struck by a vehicle they will likely cause minimum damage to the vehicle and more importantly will not injure the driver. Even DOT required "breakaway" pole bases only reduce the impact of the collision with traditional poles. Also, once a pole has been hit it can fall onto the roadway—on top of another car or causing additional damage to cars running over the debris. The VGS posts are short and easily displaced—making them much safer if they are struck.

The Wireless Network:

The security and robustness of the wireless network is of extreme importance. All systems are designed with two specific methods of accomplishing this:
1. For security, all of the wireless communication is encrypted—both in the firmware and in the software. No unauthorized changes to the software or firmware will be allowed. This is done by building in the encryption at the device level to retain the integrity of the network devices. This prevents any unauthorized attacks on the system. A secure channel is provided with the system to update encryption keys separate from the normal channels. Multiple channels are used both for the normal system and the secure channels. Updates to the keys are done at random times and from different sources and channels.
2. System robustness is achieved by using both long-range and short range wireless systems. Each section of VGSPs are connected to a local network (for example—covering one mile of roadway). That section of posts is connecting to one post with either a cell phone radio or a satellite radio. This relays the data to and from the master control station. Each one mile section of roadway has a network that overlaps adjacent networks. This allows another network to take over if the cell phone radio post becomes disabled for any reason. Each network is set-up to handle 3 times the number of VGSPs than it normally serves. In addition to the network redundancy, the posts are also able to be added to or removed from the network via the mesh. Up to 10 posts in a line along the roadway can be disabled and the network will "heal" itself by bypassing the disabled posts and connecting to the next active posts in the line.

Since the network connects to other outside networks for data exchange, the connection points also need to be secure to prevent any unauthorized entry into the network from outside sources. All data will be transmitted via a firewall to isolate and "clean" the data to assure that nothing can be corrupted in the system.

Data Sharing:

Sharing of data between the VGS and other systems needs to happen in real time, due to:
1. Roadway conditions (traffic congestion, debris on roadway, ice, etc.);
2. ADV;
3. HOV;
4. Weather conditions (master station—AHJ);
5. Pedestrians;
6. Bicyclists; and/or
7. Outside sensor networks or systems.

Master Database:

All of the collected data is stored at the master station and/or in the cloud in a master database. This data can be used to predict current and future roadway conditions. Similar to weather reports, all of the data when looked at collectively as a whole provides a picture of what to expect on a given day or in a certain situation in the future. For example—if you want to leave town on the weekend, what is the typical traffic flow based on current conditions? Which route would be the best if you are travelling north, and what day(s) and time are the best time to leave? The more data that is collected over time, the better the predictive model.

Figure 1A:
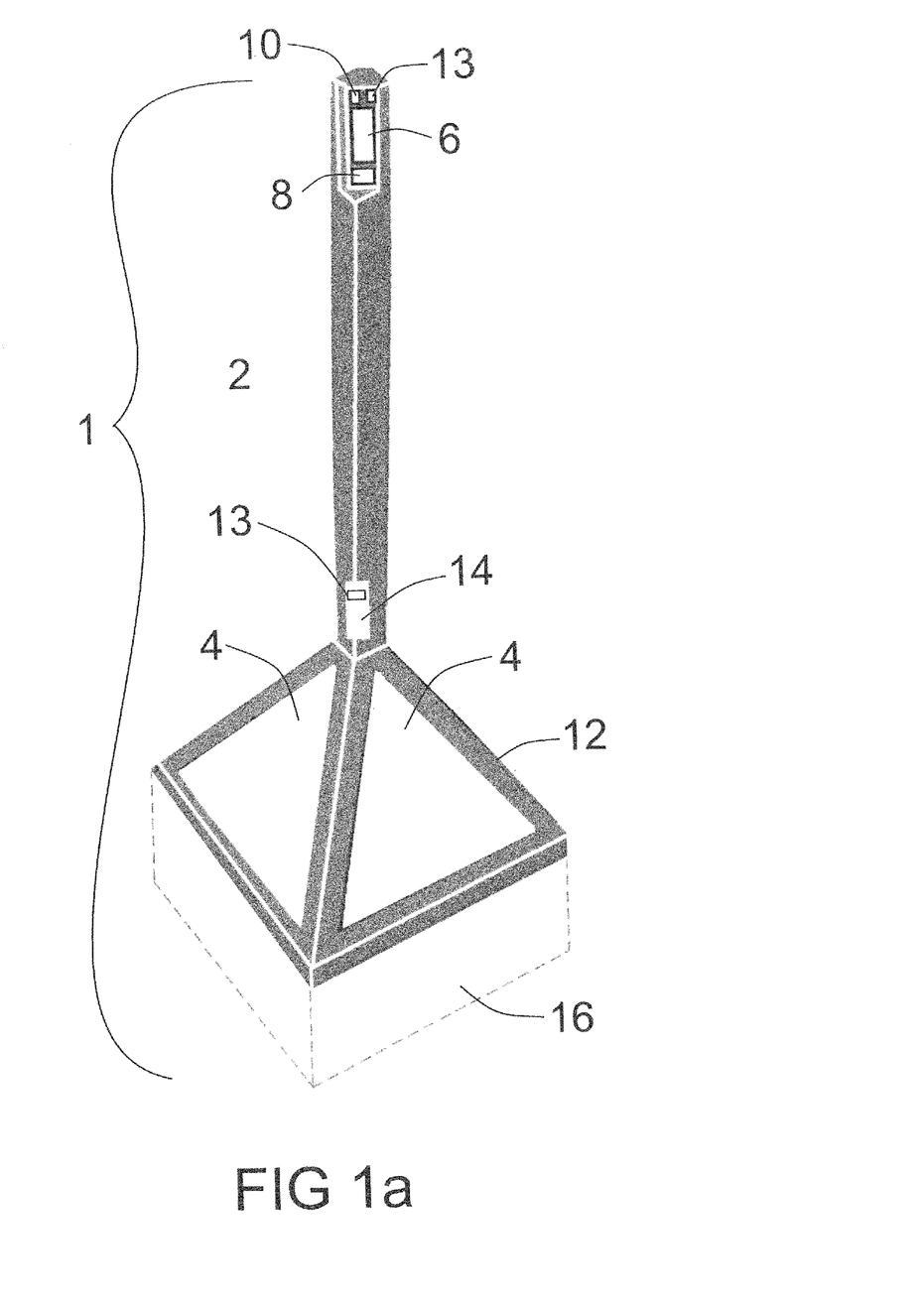
FIG. 1a is a perspective view of one embodiment of the entire Post Assembly (VGSP)

Referring Specifically to the Figures:

FIG. 1a is a perspective view of the entire post assembly. This whole assembly is referred to as the Vehicle Guidance System Post (VGSP) 1. The post 2 supports the required components that are at the top of the post. The post is structurally attached to the battery enclosure 16 that is embedded in the ground. The base enclosure 12 houses the required components for the operation of the VGS (See FIG. 1b). The solar collectors 4 are mounted on top of the base enclosure, and are at an angle to allow snow, rain and debris to fall off. The LED Light Modules (LDM) 6 are mounted at the front (traffic facing), and the sensor arrays 10 are mounted at the front and back. Notification LEDs 13 are mounted on the front and back sensor arrays. Reflectors 8 are also mounted both on the front and back.

Figure 1B:
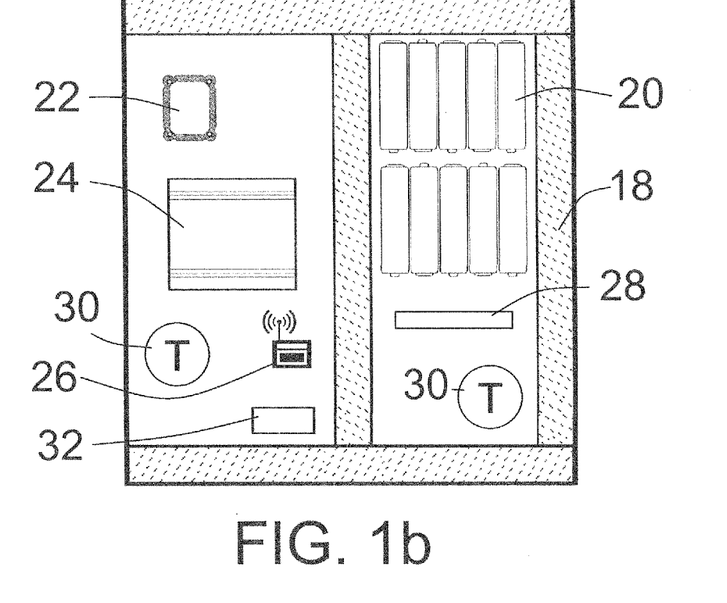
FIG. 1b is a graphic representation of the components inside the enclosure at the base of the post.

FIG. 1b is a graphic representation of the components inside the enclosure at the base of the post. The batteries 20 surrounded by insulation 18 and phase change material as required (based on geographic area they are installed in). The base enclosure houses and protects from the weather the control system 22, cell phone or satellite radio and equipment 24, Circuit protection—circuit breakers 32, wireless router device and radio 26, Vibration Sensor 28, and Temperature Sensor(s) 30 in each compartment.

Figure 1C:
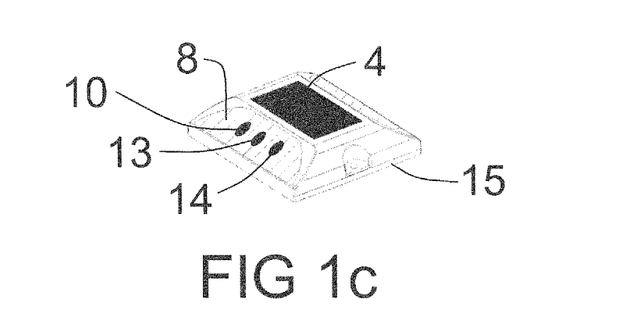
FIG. 1c is a perspective view of the roadway marker "stud"

FIG. 1c is a perspective view of the Solar Powered Roadway Stud (SPRS) 15. It has a solar collector 4 on the top of the unit, Notification LEDs 13 and reflectors 8 on the front and back sensor arrays 10.

Figure 1D:
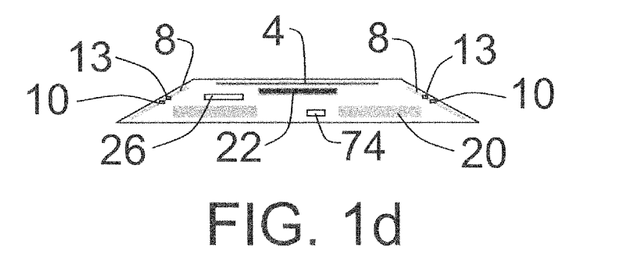
FIG. 1d is a cross section of the roadway marker

FIG. 1d is a cross section of the SPRS. Solar collector 4 is on top, Reflectors 8 and Notification LEDs 13 are on both the front and back. The enclosure houses the control system 22, capacitors or batteries 20, Wireless Radio 26, and vibration sensor 74.

Figure 2A:
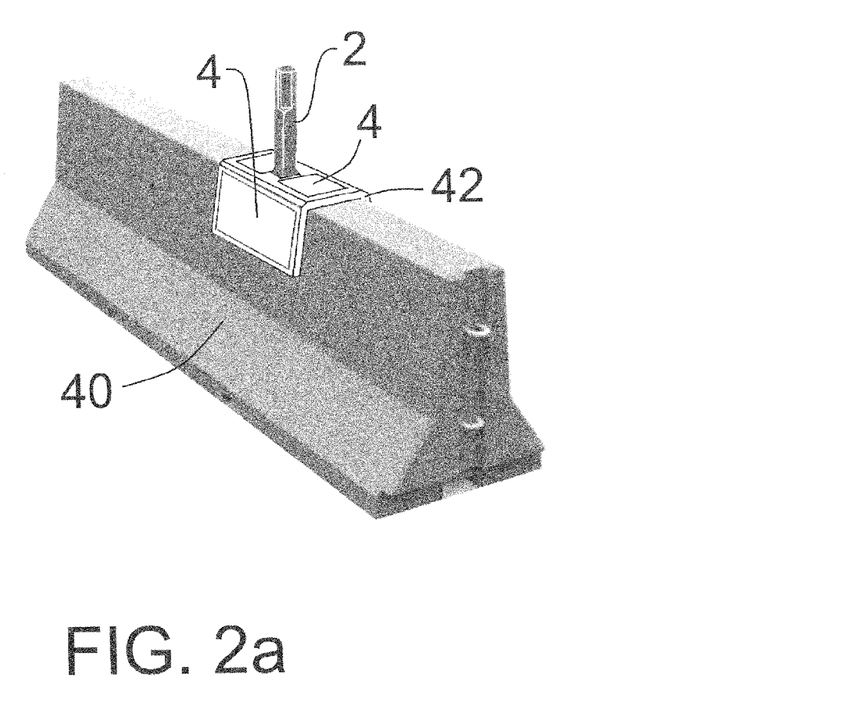
FIG. 2a is a perspective view of the VGSP mounted on a roadside concrete barrier

FIG. 2a is a perspective view of the VGSP mounted on a roadside concrete barrier 40. The modified base enclosure 42, conforms to the shape of the barrier and is attached to it. Post 2 is structurally mounted to the base enclosure. The solar collectors 4 are on the top and sides of the barrier.

Figure 2B:
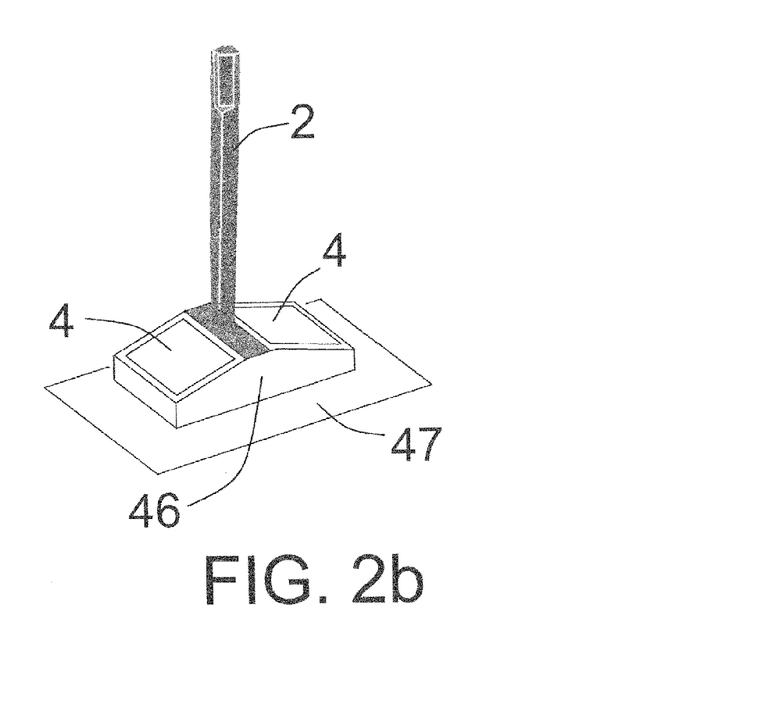
FIG. 2b is a perspective view of the VGSP with an alternate base enclosure (near equator)

FIG. 2b is a perspective view of the VGSP with an alternate base enclosure (near equator). This drawing illustrates another possible configuration of the base enclosure 46 that still meets the basic requirement that the solar is sloped downwards. It also is raised above the ground level to be above accumulation of snow or debris. The angle of the solar is flatter to function in geographic areas closer to the equator where the sun is typically high in the sky during the day. An optional base plate 47 is mounted below the enclosure to prevent vegetation from growing too high and shading the solar.

Figure 2C:
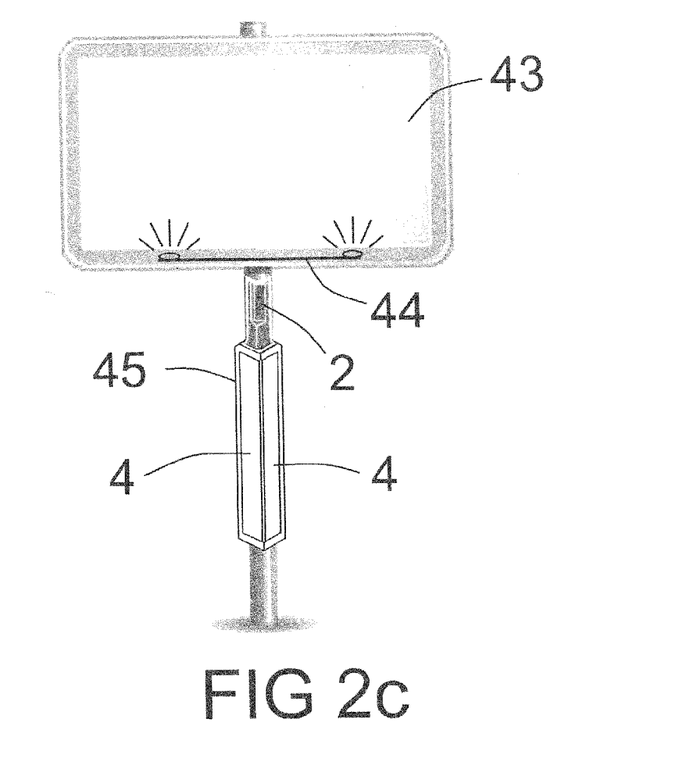
FIG. 2c shows an alternate mounting of the VGSP on a roadside sign

FIG. 2c shows an alternate mounting of the VGSP on a roadside sign 43. The enclosure 45 for a roadside sign conforms to the pole and attaches to it. Solar collectors 4 are vertically mounted, and the post 2 is mounted right below the sign. Optional LEDs 44 to illuminate the sign can be powered from the VGSP.

Figure 2D:
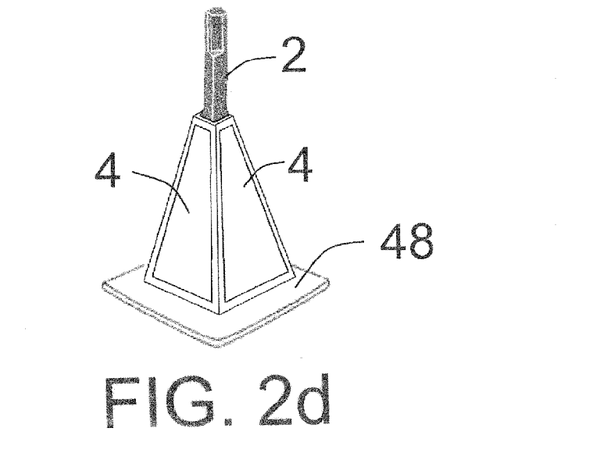
FIG. 2d is a perspective view of the VGSP with an alternate base enclosure (higher latitude)

FIG. 2d is a perspective view of the VGSP with an alternate base enclosure (higher latitude). The steeper angle solar panels 4 of this configuration of base enclosure 48 is for higher latitudes, and also can be used as a temporary VGSP to be used during construction to provide continuity (and improve safety) of the VGS throughout the construction zone. The post 2 is mounted on the top.

Figure 3:
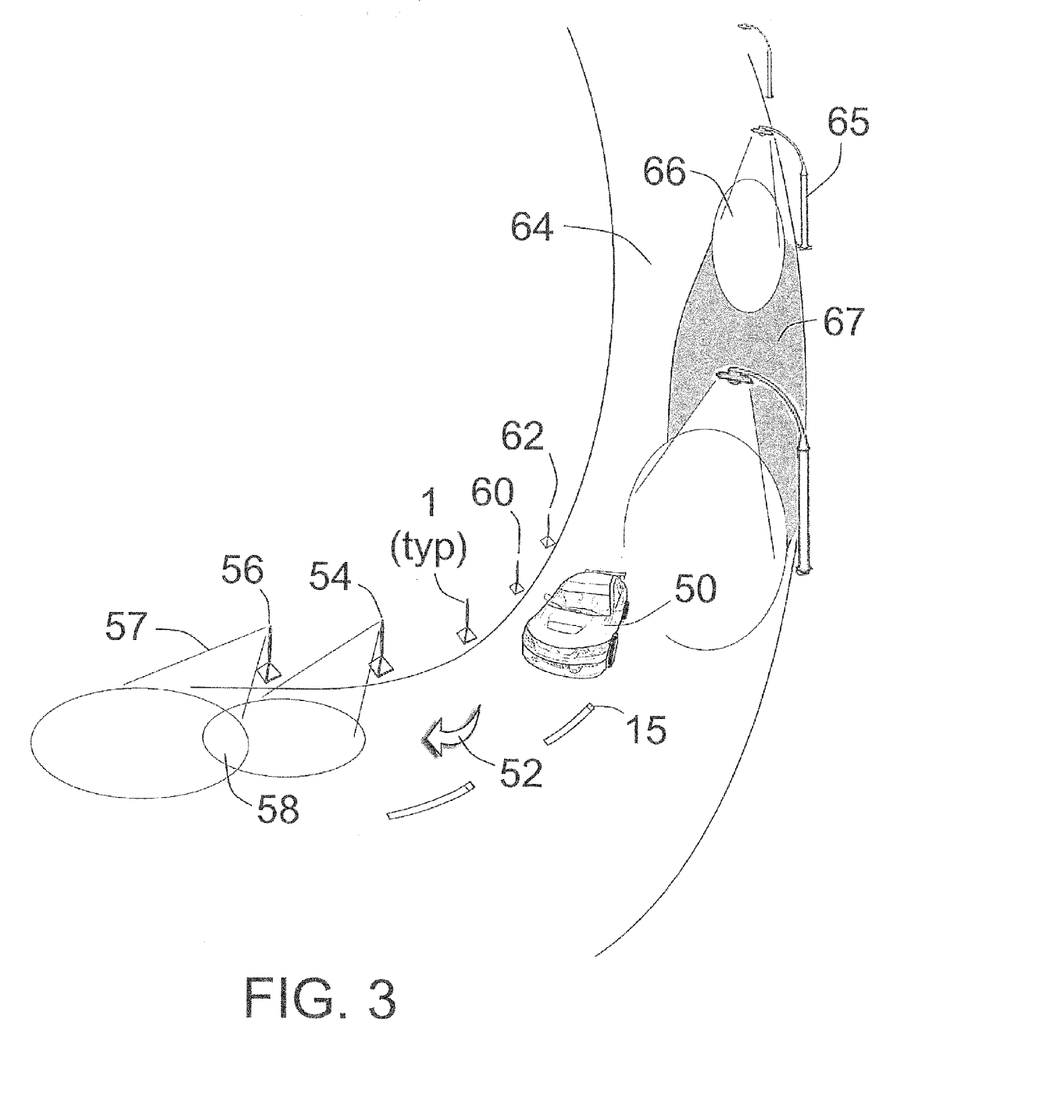
FIG. 3 is an illustration of a car driving down a road illuminated by light poles and VGS posts.

FIG. 3 is an illustration of a car driving down a road illuminated by light poles and VGS posts. The roadway 64 is shown with traditional poles 65 in order to illustrate the differences between traditional lighting and the VGSPs 1. Traditional lighting is high up on the pole and creates glare for the drivers as they are approaching the lights. Also, traditional lighting is spaced far apart which creates dark areas 67 between the poles. The lighting distribution of traditional pole lights 66 pools at the base of the pole and is not evenly distributed.

As the car drives into the section of roadway where the VGS system components are shown, in the direction of arrow 52, the first post 62 activates the system, and pole 60 then 54 and 56 in progressive order turn on and illuminate the roadway in the direction of travel. The light emitted 57 from the VGSP is directed forward onto the roadway in the direction of travel, and away from the driver. Since the spacing of the posts is much closer than traditional, the lighting distribution is much more even and uniform.

The SPRS 15 is in line with the line striping and assists with visually guiding the vehicle by identifying the traffic lane.

Figure 4A:
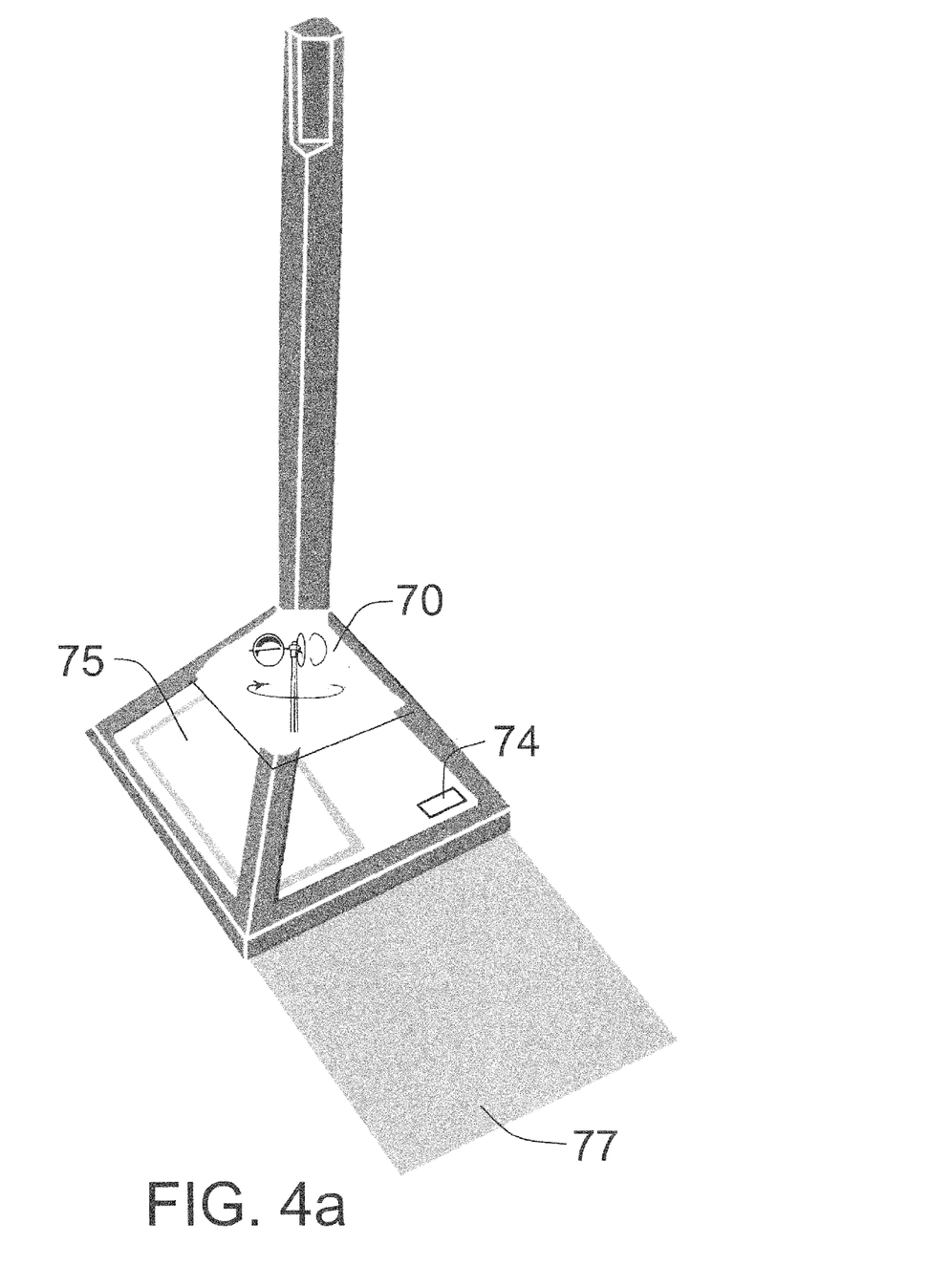
FIG. 4a shows the VGSP with additional sensors and components in base and at roadway level.

FIG. 4a shows the VGSP with additional sensors and components in base and at roadway level. Anemometer 70 is mounted inside the base enclosure with window openings to allow air flow thru the top section of the enclosure. Vibration Sensor 74 and Vibration harvesting device 75 are mounted inside the lower part of the enclosure. Heat collection mat 77 for harvesting heat energy is mounted outside of the enclosure and is conformally attached to the roadway shoulder.

Figure 4B:
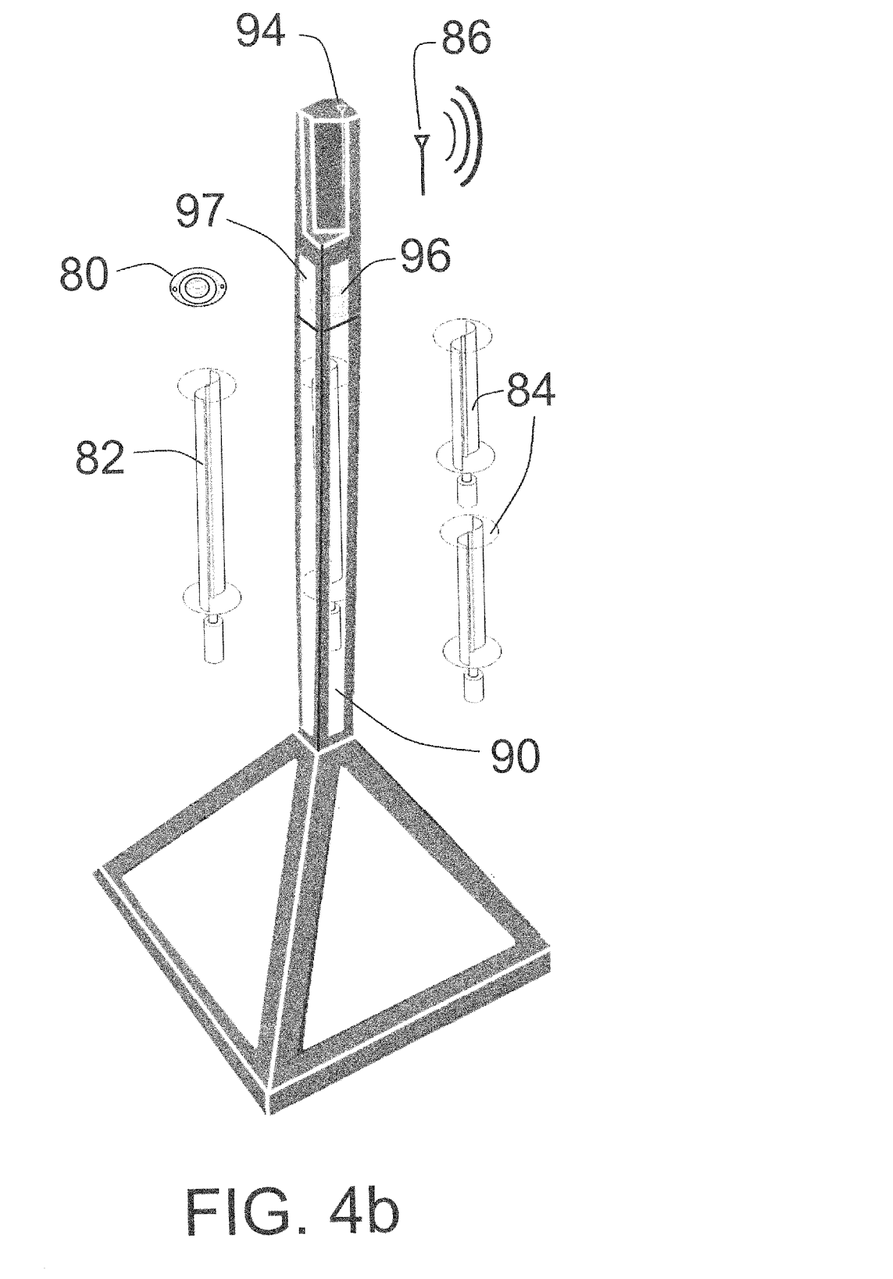
FIG. 4b shows the VGSP with additional sensors and components in the post section.

FIG. 4b shows the VGSP with additional sensors and components in the post section. Long slotted openings 90 the length of the post allow airflow to pass thru the post and operate the vertical axis wind turbines for power production from the wind. This includes drafts from vehicles passing the VGSP. A single turbine 82, or two turbines 84 (for redundancy) are located inside the post. Camera 80 and motion sensor 97 are mounted near the top of the post behind a protective clear 97 (glass or similar) lens. The antenna 86 for the radio and wireless system is mounted near the top 94 of the post.

Although this invention has been described above with reference to particular means, materials and embodiments, it is to be understood that the invention is not limited to these disclosed particulars, but extends instead to all equivalents within the scope of the following claims.

The invention claimed is:

1. A vehicle guidance system comprising a network of sensors and indicators extending along a roadway being traveled by a vehicle, the network comprising:
   multiple post assemblies spaced along the roadway, each holding at least one light module that illuminates a portion of the roadway forward from the post assembly, the post assembly being less than 5 feet tall;
   a sensor array for sensing ambient or environmental conditions at or near at least one of said post assemblies and on or near the roadway along which the post assemblies are spaced, wherein at least one or more sensors of the sensor array activate the network based on light, wind, or vibration of an approaching vehicle;
   a sensor communication/electronic-signaling network that signals at least one indicator of the ambient or environmental conditions, wherein the at least one indicator may be said at least one notification LED on one more of the post assemblies, a flashing or blinking light, an audible alarm, a digital sign, a signal to an on-vehicle alarm, a signal to an on-vehicle monitor, a signal to an on vehicle video screen, and another visual or audible signal: and
   wherein activation of a sensor, of the sensor array, on multiple, adjacent post assemblies causes communication between the post assemblies to relay info about road conditions such as ice, rain, road damage, bridge damage, and other conditions.

2. The system of claim 1, wherein each post assembly comprises a solar panel.

3. The system as in claim 1, further comprising solar-powered roadway markers.

4. The system as in claim 1 comprising at least one solar panel on at least one of the post assembly so the system is solar-powered and autonomous, so that the system requires no utility power grid connection.

5. The system as in claim 1, wherein activation of a sensor, of the sensor array, on multiple, adjacent post assemblies causes communication between the post assemblies to relay info about direction and speed of travel of vehicles on the roadway, informing approaching vehicles of a need to slow down or stop.

6. The system as in claim 1, wherein the post assemblies are illuminated a quarter of a mile ahead of the travel of the vehicle, lighting ahead of the vehicle.

7. The system as in claim 6, wherein the at least one notification LED remains "ON" when there are no vehicles on the road.

8. The system as in claim 1, wherein, said at least one light module on each post assembly being on, and with vehicles passing between opposite post assemblies, a light pathway of said at least one light on each post assembly is interrupted and a motion of the vehicle is identified thereby.

9. The system as in claim 1, wherein, as the vehicle passes between multiple post assemblies, the system determines the speed and direction of the vehicle.

10. The system as in claim 1, wherein the vehicle's headlights will activate the system, and the system is in a dormant or energy-saving mode until the activation by the headlights of an oncoming vehicle.

11. The system as in claim 1, wherein said one or more sensors of the sensor array are selected from motion sensors, vibration sensors, and anemometers that detect the wind created by passing vehicles.

12. The system as in claim 1, wherein said at least one light of the light module illuminates a portion of the roadway forward and away from an approaching vehicle.

13. The system as in claim 1, wherein said at least one light of the light module illuminates a portion of the roadway forward, downward, and away from an approaching vehicle.

14. The system as in claim 1, wherein said at least one light of the light module illuminates a portion of the roadway forward, downward, and away from an approaching vehicle, illuminating an area on the roadway/ground of less than 50 square feet, less than 100 square feet, less than 200 square feet, or less than 300 square feet.

15. The system of claim 1, wherein the at least one light of the light module is focused downward, forward and away from a vehicle approaching the at least one light on a side of the roadway nearest the at least one light of the light module.

* * * * *